(12) United States Patent
Hu et al.

(10) Patent No.: US 10,057,879 B2
(45) Date of Patent: Aug. 21, 2018

(54) PAGING METHOD AND APPARATUS

(71) Applicant: Huawei Technologies Co., Ltd., Shenzhen (CN)

(72) Inventors: Zhenxing Hu, Shenzhen (CN); Wei Quan, Beijing (CN); Xiaodong Yang, Beijing (CN); Yongqiang Gao, Beijing (CN); Jian Zhang, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 15/095,779

(22) Filed: Apr. 11, 2016

(65) Prior Publication Data

US 2016/0234804 A1 Aug. 11, 2016

Related U.S. Application Data

(63) Continuation of application No. PCT/CN2014/072259, filed on Feb. 19, 2014.

(30) Foreign Application Priority Data

Oct. 12, 2013 (WO) ................ PCT/CN2013/085099

(51) Int. Cl.
*H04W 4/00* (2018.01)
*H04W 68/00* (2009.01)
(Continued)

(52) U.S. Cl.
CPC ......... *H04W 68/005* (2013.01); *H04W 68/02* (2013.01); *H04W 72/044* (2013.01)

(58) Field of Classification Search
CPC ...... H04W 36/30; H04W 68/00; H04W 88/06
(Continued)

(56) References Cited

U.S. PATENT DOCUMENTS

2008/0227449 A1* 9/2008 Gholmieh ........... H04W 68/025
 455/434
2010/0261487 A1* 10/2010 Razdan ................ H04W 68/02
 455/458

(Continued)

FOREIGN PATENT DOCUMENTS

CN 101128027 A 2/2008
CN 101836376 A 9/2010
(Continued)

*Primary Examiner* — Joshua Schwartz
(74) *Attorney, Agent, or Firm* — Slater Matsil, LLP

(57) ABSTRACT

Embodiments provide a paging method and apparatus. The method includes receiving, by user equipment (UE), a system message broadcast by a base station, where the system message carries a system parameter and configuration information of a paging message, and the configuration information includes time-frequency information of the paging message. The method also includes determining, by the UE, a paging cycle, a paging frame (PF) and a paging occasion (PO) subframe according to the system parameter, and determining, by the UE according to the configuration information, a time-frequency resource occupied by the paging message in the PO subframe. The method also includes detecting, by the UE within the paging cycle according to the PF, the PO subframe, and the time-frequency resource, whether the paging message exists in a physical downlink shared channel PDSCH.

17 Claims, 7 Drawing Sheets

(51) Int. Cl.
*H04W 68/02* (2009.01)
*H04W 72/04* (2009.01)

(58) Field of Classification Search
USPC .......................................... 455/434
See application file for complete search history.

(56) References Cited

U.S. PATENT DOCUMENTS

2010/0272037 A1  10/2010  Lee et al.
2013/0044621 A1   2/2013  Jung et al.
2013/0344903 A1*  12/2013  Li ........................... H04W 4/08
                                                     455/458

FOREIGN PATENT DOCUMENTS

| CN | 101998418 A | 3/2011 |
| CN | 102065516 A | 5/2011 |
| CN | 102404808 A | 4/2012 |
| EP | 2200351 A1  | 6/2010 |

\* cited by examiner

PAGING METHOD AND APPARATUS

This application is a continuation of International Application No. PCT/CN2014/072259, filed on Feb. 19, 2014, which claims priority to International Application No. PCT/CN2013/085099, filed on Oct. 12, 2013, both of which are hereby incorporated by reference in their entireties.

TECHNICAL FIELD

The present invention relates to the field of communications technologies, and in particular, to a method and an apparatus for paging user equipment UE by a base station.

BACKGROUND

In a Long Term Evolution (LTE for short) system of mobile communications system technologies, a paging message is carried by a physical downlink shared channel (PDSCH for short). A process of receiving, by user equipment (UE for short), a paging message in a discontinuous reception (DRX for short) manner is as follows: broadcasting, by a base station, a system parameter to all UEs; obtaining, by each UE on the basis of the system parameter, a paging frame (PF for short) and a paging occasion (PO for short) occupied by a corresponding paging message on a PDSCH; listening to, by the UE starting from a PO subframe of the PF, whether a paging-radio network temporary identifier (P-RNTI for short) exists in a physical downlink control channel (PDCCH for short); if yes, acquiring, by the UE, information about a time-frequency resource occupied by the paging message from the PDCCH; and finally, receiving, by the UE, the paging message on the time-frequency resource of the PDSCH. Because some UEs may be machine-type UEs such as a power meter and a water meter located in a coverage area with poor signal quality, for example, placed in a building, a basement or an iron box, and a signal may have a maximum loss of 20 dB, UE located in a coverage area with poor signal quality needs to be enabled to receive a paging message normally.

Usually, a base station repeatedly sends a paging message by using a PDSCH and a PDCCH to ensure that UE located in a coverage area with poor signal quality normally receives the paging message. However, different quantities of times of repetition may be required for different physical channels, for example, repetition of 100 to 200 times may be required for a PDCCH; therefore, such a manner obviously increases resources occupied by a paging message on a PDSCH and a PDCCH and increases paging delay.

SUMMARY

In view of this, a technical problem to be resolved by embodiments is how to reduce resources occupied by a paging message.

In order to resolve the foregoing problem, according to a first aspect, an embodiment provides a paging method, including: receiving, by user equipment (UE), a system message broadcast by a base station, where the system message carries a system parameter and configuration information of a paging message, and the configuration information includes time-frequency information of the paging message; determining, by the UE, a paging cycle, a paging frame PF and a paging occasion PO subframe according to the system parameter; determining, by the UE according to the configuration information, a time-frequency resource occupied by the paging message in the PO subframe; and detecting, by the UE within the paging cycle according to the PF, the PO subframe, and the time-frequency resource, whether the paging message exists in a physical downlink shared channel PDSCH.

With reference to the first aspect, in a first possible implementation manner, the configuration information further includes mode information of the PO subframe, where the mode information is used to specify the PO subframe occupied by the base station for sending the paging message. The determining, by the UE, a paging cycle, a paging frame PF and a paging occasion PO subframe according to the system parameter includes: determining, by the UE, the paging cycle according to the system parameter; determining, by the UE, the PF according to the system parameter and the paging cycle; and determining, by the UE, the PO subframe according to the PF and the mode information.

With reference to the first possible implementation manner of the first aspect, in a second possible implementation manner, if the configuration information includes multiple pieces of the mode information, before the determining, by the UE, the PO subframe according to the PF and the mode information, the method includes: selecting, by the UE according to a coverage enhancement level of the UE, corresponding mode information.

With reference to the first aspect, in a third possible implementation manner, the configuration information further includes an extension coefficient of the paging cycle. The determining a paging cycle includes: determining the paging cycle according to the system parameter and the extension coefficient.

With reference to the foregoing possible implementation manners of the first aspect, in a fourth possible implementation manner, the paging message includes allocation information of an uplink resource of the UE. After the detecting, by the UE according to the PF, the PO subframe, and the time-frequency resource, whether the paging message exists in a physical downlink shared channel PDSCH, the method includes: if the UE detects that there is the paging message for the UE on the PDSCH, determining, by the UE, the uplink resource according to the allocation information; and sending, by the UE, uplink data or signaling on the uplink resource to the base station.

In order to resolve the foregoing problem, according to a second aspect, an embodiment provides a paging method, including: broadcasting, by a base station, a system message to UE, where the system message carries a system parameter and configuration information of a paging message, the configuration information includes time-frequency information of the paging message, and the system message is used to instruct the UE to determine a paging cycle, a PF and a PO subframe according to the system parameter and determine, according to the time-frequency information, a time-frequency resource occupied by the paging message in the PO subframe.

With reference to the second aspect, in a first possible implementation manner, the configuration information further includes mode information of the PO subframe, where the mode information is used to specify the PO subframe occupied by the base station for sending the paging message; or the configuration information further includes an extension coefficient of the paging cycle.

With reference to the second aspect, in a second possible implementation manner, the method further includes: sending, by the base station within the paging cycle according to the PF, the PO subframe, and the time-frequency resource, the paging message to the UE by using a PDSCH.

With reference to the second possible implementation manner of the second aspect, in a third possible implementation manner, the paging message includes allocation information of an uplink resource of the UE, and the allocation information is used to instruct the UE to send, to the base station, uplink data or signaling on the uplink resource determined according to the allocation information.

In order to resolve the foregoing problem, according to a third aspect, an embodiment provides a paging apparatus. The apparatus includes a receiving module, configured to receive a system message broadcast by a base station, where the system message carries a system parameter and configuration information of a paging message, and the configuration information includes time-frequency information of the paging message. The apparatus also includes a first processing module, connected to the receiving module and configured to determine a paging cycle, a paging frame PF and a paging occasion PO subframe according to the system parameter; a second processing module, connected to the receiving module and configured to determine, according to the configuration information, a time-frequency resource occupied by the paging message in the PO subframe. The apparatus also includes a detection module, connected to the first processing module and the second processing module and configured to detect, within the paging cycle according to the PF, the PO subframe, and the time-frequency resource, whether the paging message exists in a physical downlink shared channel PDSCH.

With reference to the third aspect, in a first possible implementation manner, the configuration information further includes mode information of the PO subframe, where the mode information is used to specify the PO subframe occupied by the base station for sending the paging message. The first processing module is further configured to: determine the paging cycle according to the system parameter; determine the PF according to the system parameter and the paging cycle; and determine the PO subframe according to the PF and the mode information.

With reference to the first possible implementation manner of the third aspect, in a second possible implementation manner, if the configuration information includes multiple pieces of the mode information, the first processing module is further configured to select corresponding mode information according to a coverage enhancement level of the UE.

With reference to the third aspect, in a third possible implementation manner, the configuration information further includes an extension coefficient of the paging cycle. The first processing module is further configured to determine the paging cycle according to the system parameter and the extension coefficient.

With reference to the foregoing possible implementation manners of the third aspect, in a fourth possible implementation manner, the paging message includes allocation information of an uplink resource of the UE. The paging apparatus further includes: a third processing module, connected to the receiving module and configured to, if it is detected that there is the paging message for the UE on the PDSCH, determine the uplink resource according to the allocation information; and a sending module, connected to the third processing module and configured to send uplink data or signaling on the uplink resource to the base station.

In order to resolve the foregoing problem, according to a fourth aspect, an embodiment provides a paging apparatus. The apparatus also includes a broadcasting module, configured to broadcast a system message to UE, where the system message carries a system parameter and configuration information of a paging message, the configuration information includes time-frequency information of the paging message, and the system message is used to instruct the UE to determine a paging cycle, a PF and a PO subframe according to the system parameter and determine, according to the time-frequency information, a time-frequency resource occupied by the paging message in the PO subframe.

With reference to the fourth aspect, in a first possible implementation manner, the configuration information further includes mode information of the PO subframe, where the mode information is used to specify the PO subframe occupied by the base station for sending the paging message; or the configuration information further includes an extension coefficient of the paging cycle.

With reference to the fourth aspect, in a second possible implementation manner, the apparatus further includes: a paging module, connected to the broadcasting module and configured to send, within the paging cycle according to the PF, the PO subframe, and the time-frequency resource, the paging message to the UE by using a PDSCH.

With reference to the second possible implementation manner of the fourth aspect, in a third possible implementation manner, the paging message includes allocation information of an uplink resource of the UE, and the allocation information is used to instruct the UE to send, to the base station, uplink data or signaling on the uplink resource determined according to the allocation information.

UE receives a system message broadcast by a base station, where the system message includes a system parameter and configuration information of a paging message, so that the UE determines, according to the system parameter and the configuration information, a time-frequency resource occupied by the paging message. Because the system message may be broadcast by using an existing broadcasting manner, such as a PBCH, of a system, according to the paging method and apparatus in the embodiments of the present invention, channel resources of the system can be saved without occupying a physical downlink control channel PDCCH; in particular, when the base station needs to repeatedly send a paging message to the UE, paging delay can be reduced, so that the UE located in a coverage area with poor signal quality can normally and efficiently receive the paging message.

According to the following detailed descriptions of exemplary embodiments with reference to accompanying drawings, other features and aspect of the embodiments of the present invention become clearer.

BRIEF DESCRIPTION OF THE DRAWINGS

For a more complete understanding of the present invention, and the advantages thereof, reference is now made to the following descriptions taken in conjunction with the accompanying drawings, in which.

Accompanying drawings that are included in the specification and that constitute a part of the specification show, along with the specification, exemplary embodiments, features, and aspects of the present invention, and are used to explain a principle of the present invention.

DETAILED DESCRIPTION OF ILLUSTRATIVE EMBODIMENTS

Figure 1:
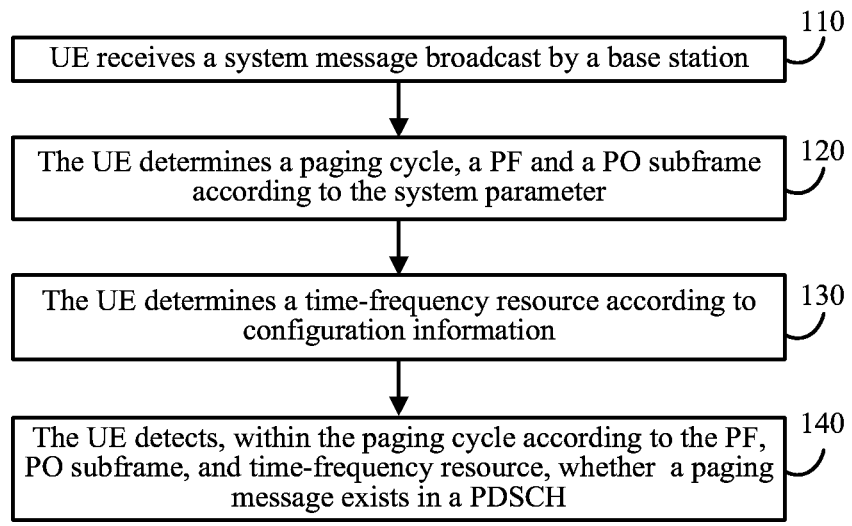
FIG. 1 shows a flowchart of a paging method according to an embodiment.

The following describes various exemplary embodiments, features, and aspects of the present invention in detail with reference accompanying drawings. Same reference numerals in the accompanying drawings designate elements that have same or similar functions. Various aspects of the embodiments illustrated in the accompanying drawings may not be necessarily drawn to scale, unless otherwise specified.

The word "exemplary" specially used herein indicates "used as an example or embodiment, or illustrative". Any embodiment that is described as an exemplary embodiment should not be construed to be preferred over or better than another embodiment.

In addition, numerous specific details are set forth in the following specific embodiments in order to better describe the present invention. However, a person skilled in the art should understand that the present invention may be practiced without some specific details. In some other instances, methods, means, elements, and circuits well known to a person skilled in the art are not described in detail so as to highlight the subject matter of the present invention.

Embodiment 1

FIG. 1 shows a flowchart of a paging method according to an embodiment. As shown in FIG. 1, the paging method mainly includes the following steps.

Step 110: UE receives a system message broadcast by a base station, where the system message carries a system parameter and configuration information of a paging message, and the configuration information includes time-frequency information of the paging message.

Specifically, user equipment (UE for short) may receive a system message broadcast by a base station on a physical broadcast channel (PBCH for short). The system message includes a system parameter and configuration information of a paging message sent by the base station to each UE. The system parameter includes default DRX parameter and paging density nB and is used to instruct the UE to determine a paging cycle, a paging frame (PF for short), and a PO subframe that are occupied by the paging message on a physical downlink shared channel (PDSCH for short) according to the system parameter. The configuration information includes time-frequency information of the paging message, and the time-frequency information is used to instruct the UE to determine, according to the time-frequency information, a time-frequency resource occupied by the paging message in the PO subframe.

Step 120: The UE determines a paging cycle, a PF and a PO subframe according to the system parameter.

Specifically, the UE may obtain, according to the default DRX parameter and paging density nB in the system parameter, a paging cycle, a PF and a PO subframe that are occupied by the paging message on the PDSCH. The PF corresponds to an LTE radio frame, and the PO subframe corresponds to a subframe in an LTE radio frame.

Step 130: The UE determines, according to the configuration information, a time-frequency resource occupied by the paging message in the PO subframe.

Specifically, the time-frequency information indicates a time-frequency resource occupied by the paging message in the PO subframe. The UE may obtain, according to the time-frequency information in the configuration information, a time-frequency resource occupied by the paging message in the PO subframe. One PO subframe may include multiple time-frequency resources, and one time-frequency resource corresponds to a data block in the PO subframe. In a same PO subframe, time-frequency resources of different channels may carry different data, where a time-frequency resource of a PDSCH is used to carry a paging message, so that the UE detects whether there is the paging message on the time-frequency resource.

Because the UE may acquire time-frequency information of the paging message by receiving the system message broadcast by the base station, and the system message may be broadcast by using an existing broadcasting manner, such as a PBCH, of a system, the UE can detect whether a paging message exists in the PDSCH without parsing a PDCCH, thereby reducing PDCCH overheads and saving channel resources of the system.

Step 140: The UE detects, within the paging cycle according to the PF, PO subframe, and time-frequency resource, whether a paging message exists in the PDSCH.

Specifically, within the paging cycle, the UE starting from the PO subframe of the PF detects whether there is a paging message on the time-frequency resource of the PO subframe. If yes, the UE receives the paging message; if not, within a next paging cycle, the UE continues detecting whether there is a paging message on the time-frequency resource.

In order to enable UE in a coverage area with poor signal quality to normally receive a paging message, a base station needs to repeatedly send the paging message in a subsequent paging cycle. A quantity of times for which the sending is repeated depends on a signal receiving level of the UE. According to a quantity N of times of repetition determined by the base station, within N successive paging cycles, the UE repeatedly detects whether there is a paging message until the UE detects that there is a paging message or a quantity of times of repetition is reached. The base station may page only one UE in one PO subframe, and then, a quantity of times for which the sending is repeated depends on a signal receiving level of the UE; or the base station may page multiple UEs in one PO subframe, and then a quantity of times for which the sending is repeated depends on a signal receiving level of UE with the worst coverage of the UEs.

It should be noted that, usually, if the UE detects that there is a paging message on the time-frequency resource, a process of processing, by the UE, the paging message is as follows: receiving, by the UE, the paging message; determining, according to a destination device identifier carried in the paging message, whether a user equipment identifier UE_ID of the UE is consistent with the destination device identifier; and if yes, parsing, by the UE, the paging message and sending uplink data or signaling on an uplink resource randomly accessed by the UE to the base station, so as to respond to this paging of the base station.

In the paging method of this embodiment, UE may receive a system message broadcast by a base station, where the system message includes a system parameter and configuration information of a paging message, and may determine a time-frequency resource occupied by the paging message. Because the system message may be broadcast by using an existing broadcasting manner, such as a PBCH, of a system, channel resources of the system are saved without occupying a PDCCH; in particular, when the base station needs to repeatedly send a paging message to the UE, channel resources of the system occupied for repeatedly sending the paging message are reduced, so that the UE located in a coverage area with poor signal quality can normally and efficiently receive the paging message.

Embodiment 2

Figure 2:
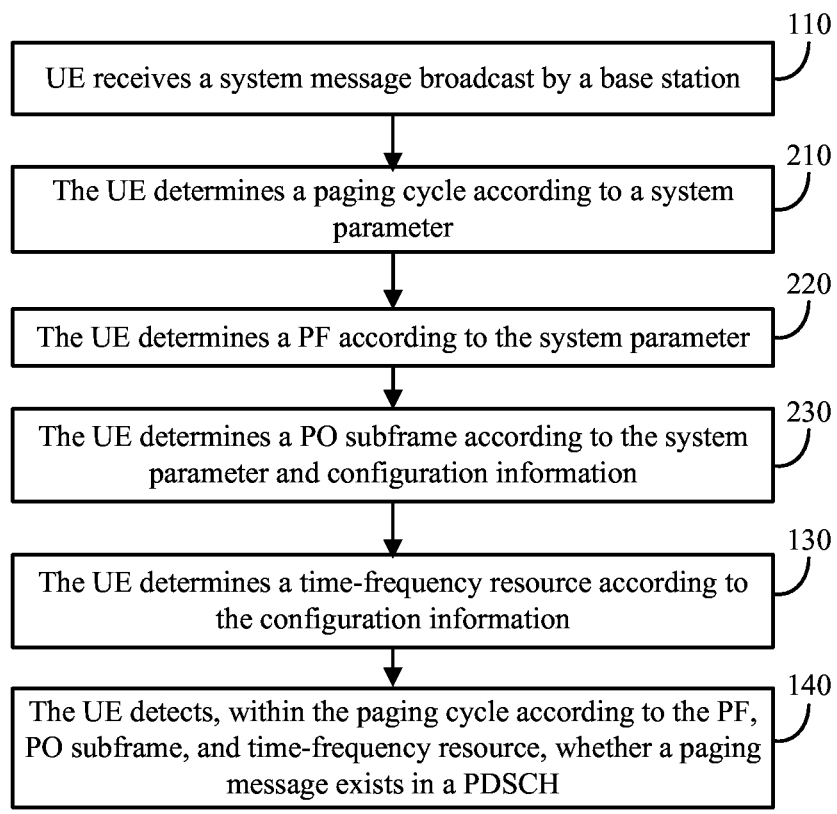
FIG. 2 shows a flowchart of a paging method according to another embodiment.

FIG. 2 shows a flowchart of a paging method according to another embodiment. In FIG. 2, components having reference signs the same as those of components in FIG. 1 have functions the same as those of the components in FIG. 1. For brevity, detailed descriptions of the components are omitted.

As shown in FIG. 2, the paging method shown in FIG. 2 differs from the paging method shown in FIG. 1 mainly in that UE may determine a paging cycle, a PF, a PO subframe, and a time-frequency resource according to information, such as time-frequency information, in configuration information.

Specifically, step 120 may specifically include the following steps:

Step 210: The UE determines the paging cycle according to the system parameter.

Specifically, the UE may select a smaller value from a system default DRX parameter included in the system parameter and a specific DRX parameter of the UE to obtain a paging cycle T occupied by the paging message. For example, if the system default DRX parameter is 128 frames, and the specific DRX parameter of the UE is 256 frames, T is 128 frames.

In a possible implementation manner, besides determining a paging cycle according to system parameter, the UE may also determine a paging cycle according to a system parameter and configuration information together. The configuration information may further include an extension coefficient of the paging cycle. The UE may determine the paging cycle according to the system parameter and the extension coefficient.

Specifically, the UE may use a product of the default DRX parameter included in the system parameter and the extension coefficient as a paging cycle T, so that duration of the paging cycle T is greater than default duration, and the default duration is duration determined according to the system default DRX parameter. For example, if the system default DRX parameter is 128 frames, and the extension coefficient is 2, T is 256 frames. If the configuration information includes the extension coefficient of the paging cycle, the base station sends the paging message by using the extended paging cycle T; accordingly, the UE may determine a PF and a PO subframe according to the extended paging cycle T.

If the base station needs to perform a large quantity of times of repeated sending to the UE, time-frequency resources occupied by paging messages of different UEs may overlap with each other, which increases a probability that a paging collision occurs between different UEs. An interval between paging cycles of different UEs may be increased by extending the paging cycle, which increases a probability that a paging collision occurs between different UEs.

It should be noted that the configuration information may include one or more extension coefficients. Different extension coefficients may correspond to signal receiving levels of different UEs. If the configuration information includes multiple extension coefficients, the UE may determine a corresponding extension coefficient according to a signal receiving level of the UE and obtain a paging cycle T according to the extension coefficient.

Step 220: The UE determines the PF according to the system parameter.

Specifically, the UE may select a smaller value from the paging density nB obtained in step 110 and the paging cycle T obtained in step 210 to obtain a quantity N of PFs in one paging cycle T; obtain a user equipment identifier UE_ID according to UE_ID=IMSI mod 1024; and according to the user equipment identifier UE_ID, obtain that a frame number of the PF is a value of an SFN that satisfies SFN mod T=(T div N)*(UE_ID mod N). The IMSI is a unique international mobile subscriber identity (English: international mobile subscriber identity, IMSI for short) of the UE. For example, if T is 128 frames, nB equals T, that is, 128 frames, and UE_ID is 132, then N is 128, and it is obtained that the PF is a frame satisfying SFN=4+128*n (n is a natural number).

Step 230: The UE determines the PO subframe according to the system parameter and configuration information.

The configuration information may include one or more types of information such as time-frequency information, mode information, multiplexing information, and an extension coefficient of a paging cycle. According to the different types of configuration information, a manner of determining the PO subframe in step 230 may include either of the following:

Manner 1: If the configuration information includes only time-frequency information, the UE determines the PO subframe according to the PF and the system parameter.

Specifically, the UE gets a maximum value from 1 and nB/T according to the paging density nB obtained in step 110 and the paging cycle T obtained in step 210, to obtain a quantity Ns of PO subframes in the PF; obtains i_s=floor (UE_ID/N) mod Ns according to the quantity N of PFs in one paging cycle T obtained in step 210, a user equipment identifier UE_ID and Ns; and obtains a PO subframe (namely, an initial PO subframe) according to correspondences between i_s and a PO subframe in different LTE network modes, for example, a correspondence between i_s and a PO subframe in frequency division duplex Long Term Evolution (FDD-LTE for short) mode shown in Table 1. For example, if T is 128 frames, and nB is 128 frames, then Ns is 1, and i_s is 0; it is obtained according to Table 1 that the PO subframe is a ninth subframe.

If the base station needs to repeatedly send the paging message to the UE, the base station may send the paging message to the UE in initial PO subframes of PFs in different paging cycles in sequence, so that the UE detects whether there is a paging message in a corresponding PO subframe. The base station can send a paging message to another UE in the PO subframe only after the repeated sending is completed.

TABLE 1

Correspondence between i_s and a PO subframe in FDD-LTE mode

| Ns | PO when i_s = 0 | PO when i_s = 1 | PO when i_s = 2 | PO when i_s = 3 |
|----|-----------------|-----------------|-----------------|-----------------|
| 1  | 9               | N/A             | N/A             | N/A             |
| 2  | 4               | 9               | N/A             | N/A             |
| 4  | 0               | 4               | 5               | 9               |

It should be noted that the UE may further listen to a paging message in a corresponding PO subframe only when i_s is 0. For example, according to Table 1, it could be obtained by calculation that when Ns is 0, PO subframes corresponding to UE1 when i_s is 0, 1, 2, and 3 are the $0^{th}$, $4^{th}$, $5^{th}$, and $9^{th}$ subframes respectively, and in this case, the base station may send the paging message of UE1 in the corresponding PO subframe, namely, the $0^{th}$ subframe, only when i_s is 0. Such a manner can reduce a total quantity of PO subframes occupied by a paging message of the UE and improve flexibility and efficiency of paging.

Manner 2: If the configuration information includes mode information of a PO subframe, the UE determines the PO subframe according to the PF and mode information.

Specifically, the mode information is used to specify a PO subframe occupied by the base station each time for sending the paging message to the UE. If the base station needs to repeatedly send the paging message to the UE, the base station may send the paging message in sequence in PO subframes specified in the mode information and in different paging cycles, so that the UE detects whether there is a paging message in the corresponding PO subframe. The first PO subframe in the mode information may be the initial PO subframe determined according to the manner 1, and the rest PO subframes may be determined according to a requirement of repeatedly sending the paging message. For example, if the mode information is (0, 1, 2), indicating that the PO subframes are the $0^{th}$, $1^{st}$, and $2^{nd}$ subframes, the base station may send the paging message to the UE separately in the $0^{th}$ subframe of the first PF, the $1^{st}$ subframe of the second PF, and the $2^{nd}$ subframe of the third PF within three successive paging cycles.

If the base station needs to repeatedly send the paging message to the UE, the manner 2 prevents the paging message of the UE from occupying one PO subframe for a long time, thereby reducing paging delay of another UE, reducing paging collisions between different UEs, and improving flexibility and efficiency of paging.

It should be noted that the mode information may be preset in the base station and UE; alternatively, after the UE receives the system message broadcast by the base station, the mode information is obtained from the system message, and PO subframes occupied by all paging messages sent subsequently by the base station to the UE are determined according to the mode information, so that the system message each time broadcast by the base station does not need to always include mode information.

In a possible implementation manner, if the configuration information includes multiple pieces of mode information, the UE may select corresponding mode information according to a coverage enhancement level of the UE, and then determine a PO subframe according to the manner 2.

Specifically, in a same coverage area, according to different signal receiving levels of UEs, different UEs need different coverage enhancement levels. The base station may configure different paging resources for different UEs accordingly, and set different mode information for different paging resources, so that UE detects whether there is a paging message only in a PO subframe corresponding to the UE. For example, in a same coverage area, if losses of UE1 and UE2 when receiving a signal are separately 20 dB and 15 dB, it may be obtained accordingly that quantities of times of repetition needed by UE1 and UE2 are separately, for example, 5 and 3, that is, the coverage enhancement level to which UE1 belongs is higher than that to which UE2 belongs, and mode information configured by the base station for UE1 and mode information configured by the base station for UE2 are (0, 3, 4, 5, 6) and (0, 1, 2) respectively.

If the base station needs to repeatedly send the paging message to multiple UEs, such as manner reduces a total quantity of PO subframes occupied by the paging message sent by the base station to UEs of a same coverage enhancement level, thereby improving flexibility and efficiency of paging.

It should be noted that the coverage enhancement level to which the UE belongs and a corresponding paging resource of the UE may be preset in the base station; alternatively, the UE detects a signal receiving level of the UE, determines a coverage enhancement level of the UE, obtains, after the UE receives the system message broadcast by the base station, a correspondence between the coverage enhancement level and a paging resource from the system message, and determines the paging resource corresponding to the UE according to the correspondence.

Because the UE determines a PO subframe according to the foregoing multiple types of information included in the configuration information, flexibility and efficiency of paging are improved; in particular, when the base station needs to repeatedly send the paging message to the UE, PO subframes occupied by the paging message are reduced.

In the paging method of this embodiment, PO subframes occupied by the paging message are reduced by determining, by the UE according to different information in the configuration information, a paging cycle, a PF, a PO subframe, and a time-frequency resource, and in particular, when the base station repeatedly sends the paging message to the UE, PO subframes occupied by the repeatedly sent paging message are reduced, thereby improving flexibility and efficiency of paging.

Embodiment 3

Figure 3:
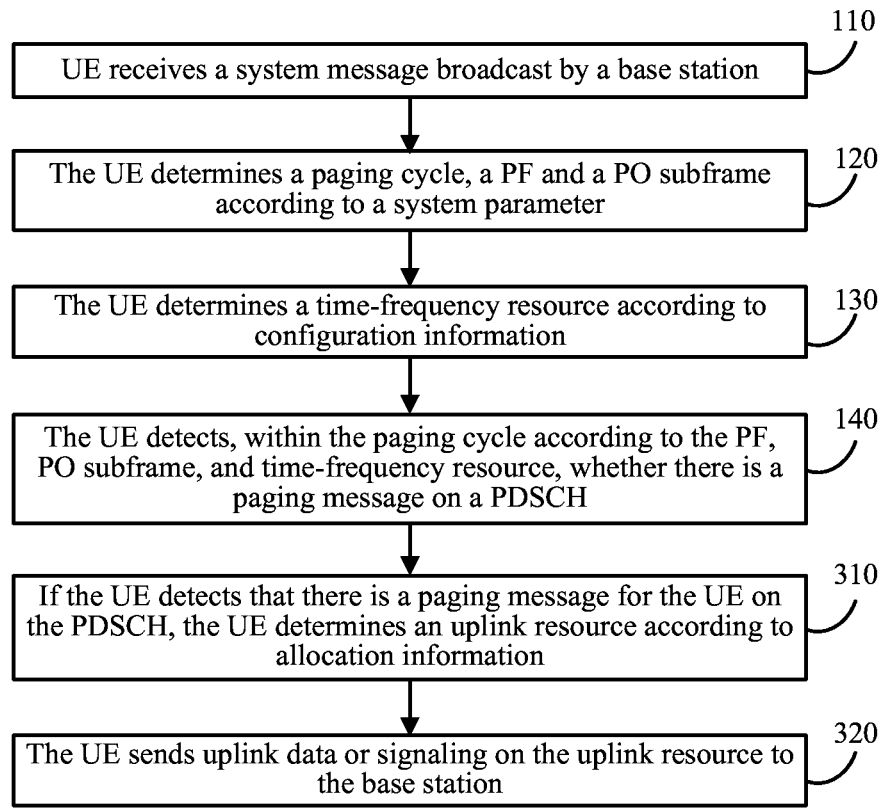
FIG. 3 shows a flowchart of a paging method according to still another embodiment.

FIG. 3 shows a flowchart of a paging method according to still another embodiment. In FIG. 3, components having reference signs the same as those of components in FIG. 1 and FIG. 2 have functions the same as those of the components in FIG. 1 and FIG. 2. For brevity, detailed descriptions of the components are omitted.

As shown in FIG. 3, the paging method shown in FIG. 3 differs from the paging methods shown in FIG. 1 and FIG. 2 mainly in: If in step 140, the UE detects that there is a paging message for the UE on a PDSCH, after step 140, the method may include the following steps:

Step 310: If the paging message includes allocation information of an uplink resource of the UE, the UE determines the uplink resource according to the allocation information.

Step 320: The UE sends uplink data or signaling on the uplink resource to the base station.

Specifically, if the UE detects that there is a paging message for the UE on the time-frequency resource, a process of processing, by the UE, the paging message is as follows: receiving, by the UE, the paging message; determining, according to a destination device identifier carried in the paging message, whether a user equipment identifier UE_ID of the UE is consistent with the destination device identifier; if yes, parsing, by the UE, the paging message and obtaining, allocation information of an uplink resource from the paging message to determine the uplink resource; and sending, by the UE, uplink data or signaling on the uplink resource to the base station, so as to respond to this paging of the base station.

Because the UE accesses the uplink resource specified by the base station, the UE does not need to randomly access the uplink resource, and such a manner improves flexibility and efficiency of paging.

Embodiment 4

Figure 4:
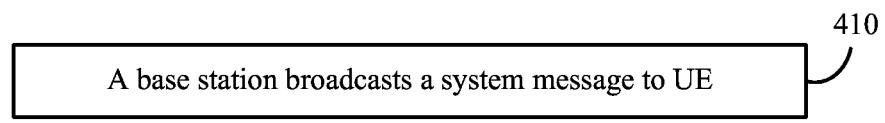
FIG. 4 shows a flowchart of a paging method according to still another embodiment.

FIG. 4 shows a flowchart of a paging method according to still another embodiment. As shown in FIG. 4, the paging method mainly includes the following steps.

Step 410: A base station broadcasts a system message to UE, where the system message carries a system parameter and configuration information of a paging message, and the configuration information includes time-frequency information of the paging message.

Specifically, the base station may map the system message to a PBCH and send the system message to all UEs in a broadcasting manner. The system message is used to instruct the UE to determine a paging cycle, a PF, a PO subframe and a time-frequency resource according to the time-frequency information, so that the UE detects whether a paging message exists in a PDSCH on the time-frequency resource occupied by the PO subframe of the PF within the paging cycle.

Because the base station can broadcast the system message to the UE, so as to enable the UE to obtain time-frequency information of the paging message, and the system message may be broadcast by using an existing broadcasting manner, such as a PBCH, of a system, the UE can detect whether a paging message exists in a PDSCH without parsing a PDCCH, thereby reducing PDCCH overheads and saving channel resources of the system; in particular, when the base station needs to repeatedly send the paging message to the UE, channel resources of the system occupied for repeatedly sending the paging message are reduced.

In a possible implementation manner, the configuration information further includes mode information of the PO subframe, where the mode information is used to specify a PO subframe occupied by the base station for sending the paging message; or the configuration information further includes multiplexing information of the PO subframe, where the multiplexing information is used to instruct the base station to simultaneously send the paging message to the multiple UEs in the PO subframe; or the configuration information further includes an extension coefficient of the paging cycle, where the extension coefficient is used to instruct the base station to determine that duration of the paging cycle is greater than default duration.

Specifically, for a mechanism of determining, by UE according to mode information, multiplexing information, or an extension coefficient of a paging cycle, a PO subframe, reference may be made to the foregoing manner 1 to manner 3, and related descriptions of the manners.

Because the configuration information broadcast by the base station includes the foregoing multiple types of information, the UE may determine a PO subframe according to the information, and flexibility and efficiency of the paging are improved; in particular, when the base station needs to repeatedly send the paging message to the UE, PO subframes occupied by the paging message are reduced.

Figure 5:
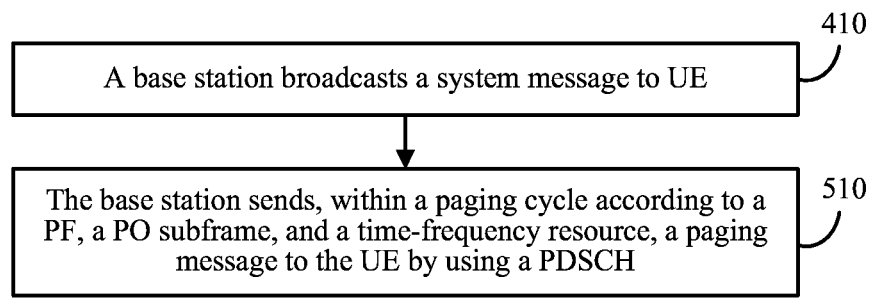
FIG. 5 shows a flowchart of a paging method according to still another embodiment.

FIG. 5 shows a flowchart of a paging method according to still another embodiment. In FIG. 5, components having reference signs the same as those of components in FIG. 4 have functions the same as those of the components in FIG. 4. For brevity, detailed descriptions of the components are omitted.

In a possible implementation manner, as shown in FIG. 5, after step 410, the method further includes the following steps.

Step 510: The base station sends, within the paging cycle according to the PF, the PO subframe, and the time-frequency resource, the paging message to the UE by using a PDSCH.

Specifically, when the base station needs to page the UE, the base station starts from a PO subframe of a PF of a paging cycle, the base station maps the paging message to the PDSCH, and sends the paging message by using a time-frequency resource occupied by the PO subframe of the PF within the paging cycle, so that the UE directly detects whether a paging message exists in a PDSCH. In addition, the base station may repeatedly send the paging message to enable the UE to repeatedly receive the paging message, so that some UEs in a coverage area with poor signal quality receive the paging message normally. For a specific mechanism of repeatedly sending, by a base station, a paging message to UE, reference may be made to step 140 and related descriptions of step 140.

In a possible implementation manner, the paging message includes allocation information of an uplink resource of the UE, and the allocation information is used to instruct the UE to send, to the base station, uplink data or signaling on the uplink resource determined according to the allocation information.

Specifically, the paging message may include allocation information of an uplink resource of the UE, so as to enable the UE to access a specified uplink resource, so that the base station receives the uplink data or signaling of the UE on the specified uplink resource.

Because the base station can specify an uplink resource of the UE, the UE does not need to randomly access the uplink resource, and such a manner improves flexibility and efficiency of paging.

Embodiment 5

Figure 6:
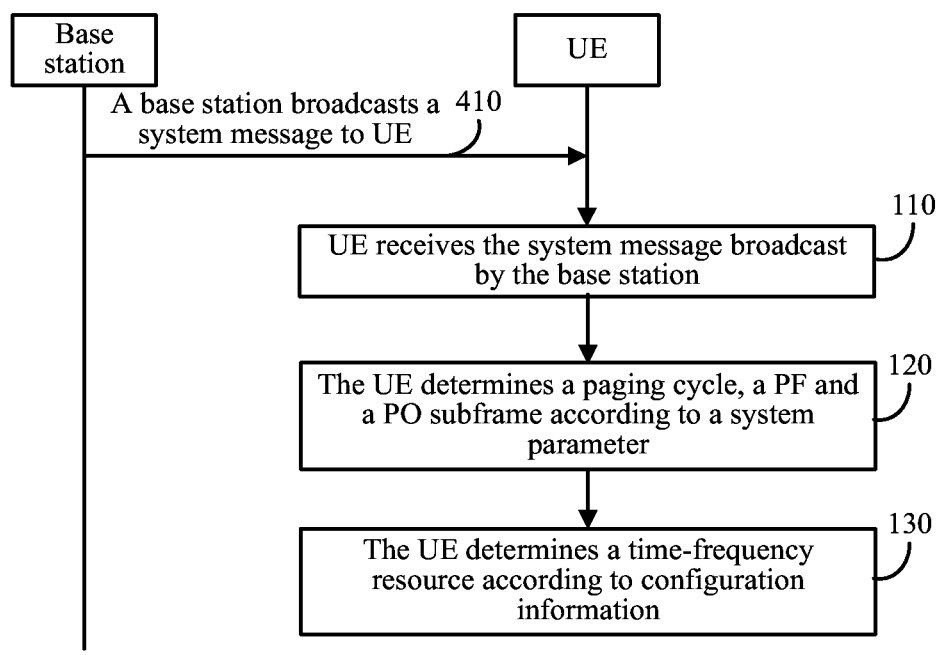
FIG. 6 shows a flowchart of a paging method according to still another embodiment.

FIG. 6 shows a flowchart of a paging method according to still another embodiment. In FIG. 6, components having reference signs the same as those of components in FIG. 1 to FIG. 5 have functions the same as those of the components in FIG. FIG. 1 to FIG. 5. For brevity, detailed descriptions of the components are omitted.

As shown in FIG. 6, the paging method shown in FIG. 6 differs from the paging methods shown in FIG. 1 to FIG. 5 mainly in that the paging method mainly includes the following steps.

Step 410: A base station broadcasts a system message to UE, where the system message carries a system parameter and configuration information of a paging message, and the configuration information includes time-frequency information of the paging message.

Step 110: The UE receives the system message broadcast by the base station, where the system message carries the system parameter and the configuration information of the paging message, and the configuration information includes the time-frequency information of the paging message.

Step 120: The UE determines a paging cycle, a PF and a PO subframe according to the system parameter.

Step 130: The UE determines, according to the configuration information, a time-frequency resource occupied by the paging message in the PO subframe.

Step 140: The UE detects, within the paging cycle according to the PF, PO subframe, and time-frequency resource, whether a paging message exists in the PDSCH.

Figure 7:
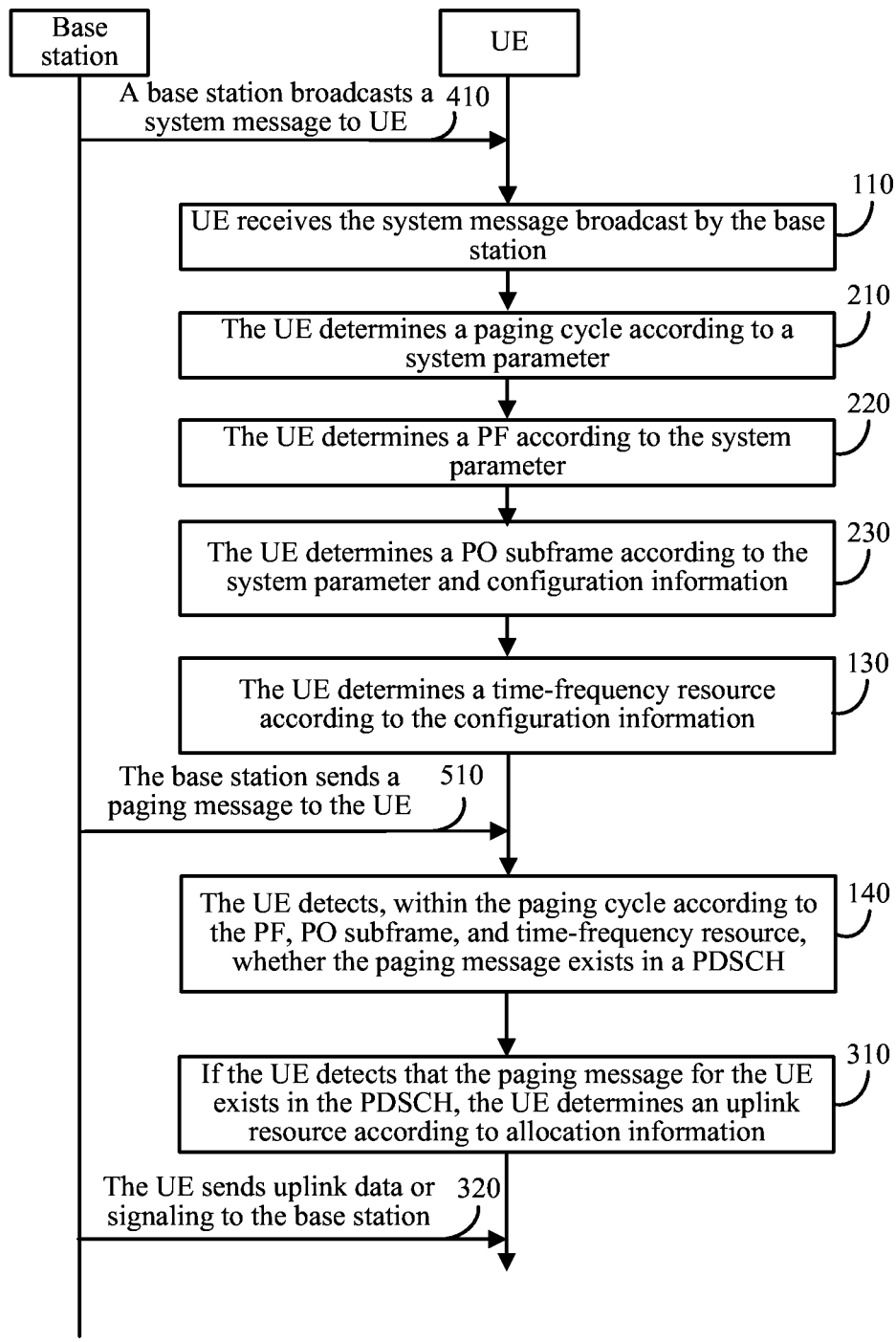
FIG. 7 shows a flowchart of a paging method according to yet another embodiment.

FIG. 7 shows a flowchart of a paging method according to yet another embodiment. In FIG. 7, components having reference signs the same as those of components in FIG. 6 have functions the same as those of the components in FIG. 6. For brevity, detailed descriptions of the components are omitted.

In a possible implementation manner, as shown in FIG. 7, after step 410, the method further includes:

Step 510: The base station sends, within the paging cycle according to the PF, the PO subframe, and the time-frequency resource, the paging message to the UE by using a PDSCH.

In a possible implementation manner, as shown in FIG. 7, step 120 may specifically include the following steps:

Step 210: The UE determines the paging cycle according to the system parameter.

Step 220: The UE determines the PF according to the system parameter.

Step 230: The UE determines the PO subframe according to the system parameter and configuration information.

Specifically, the configuration information may include one or more types of information such as time-frequency information, mode information, multiplexing information, and an extension coefficient of a paging cycle, so that the UE determines the PO subframe according to different configuration information. A specific mechanism of determining, by UE according to different configuration information, a PO subframe, reference may be made to the foregoing manner 1 to manner 3, and related descriptions of the manners.

In a possible implementation manner, as shown in FIG. 7, after step 140, the method further includes the following steps.

Step 310: If the paging message includes allocation information of an uplink resource of the UE, the UE determines the uplink resource according to the allocation information.

Step 320: The UE sends uplink data or signaling on the uplink resource to the base station.

Paging mechanisms in the paging methods shown in FIG. 6 and FIG. 7 of this embodiment are similar to those explained in the paging methods shown in FIG. 1 to FIG. 5 in the foregoing embodiments, and a person skilled in the art should understand that the foregoing possible implementation manners can be all applied to this embodiment and can produce the same beneficial effects, which are not described herein again.

Embodiment 6

Figure 8:
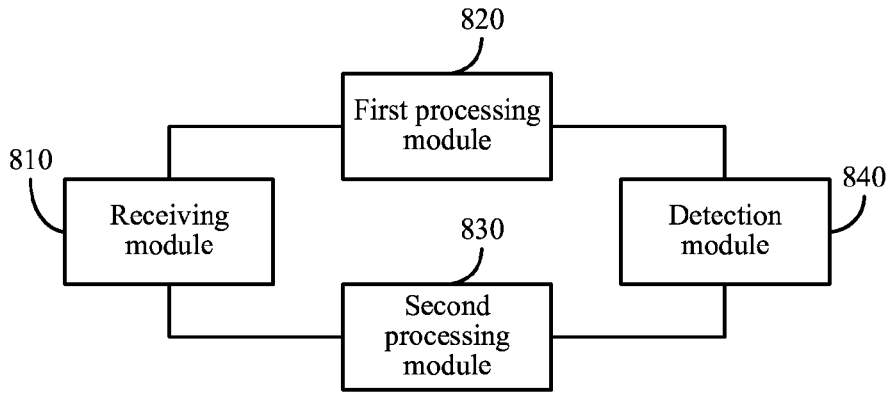
FIG. 8 shows a block diagram of a paging apparatus according to an embodiment.

FIG. 8 shows a block diagram of a paging apparatus according to an embodiment. As shown in FIG. 8, the paging apparatus includes a receiving module 810, a first processing module 820, a second processing module 830, and a detection module 840. The receiving module 810 is configured to receive a system message broadcast by a base station, where the system message carries a system parameter and configuration information of a paging message, and the configuration information includes time-frequency information of the paging message. The first processing module 820 is connected to the receiving module 810 and configured to determine a paging cycle, a paging frame PF and a paging occasion PO subframe according to the system parameter. The second processing module 830 is connected to the receiving module 810 and configured to determine, according to the configuration information, a time-frequency resource occupied by the paging message in the PO subframe. The detection module 840 is connected to the first processing module 820 and the second processing module 830 and configured to detect, within the paging cycle according to the PF, the PO subframe, and the time-frequency resource, whether the paging message exists in a physical downlink shared channel PDSCH.

Figure 9:
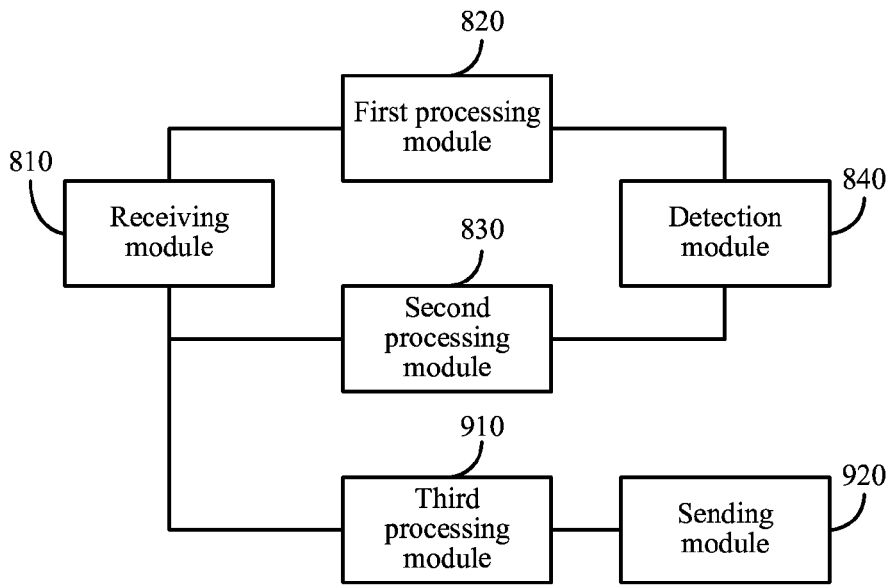
FIG. 9 shows a block diagram of a paging apparatus according to another embodiment.

FIG. 9 shows a block diagram of a paging apparatus according to another embodiment. In FIG. 9, components having reference signs the same as those of components in FIG. 8 have functions the same as those of the components in FIG. 8. For brevity, detailed descriptions of the components are omitted.

In a possible implementation manner, as shown in FIG. 9, the configuration information further includes mode information of the PO subframe, where the mode information is used to specify the PO subframe occupied by the base station for sending the paging message. The first processing module is further configured to: determine the paging cycle according to the system parameter; determine the PF according to the system parameter and the paging cycle; and determine the PO subframe according to the PF and the mode information.

In a possible implementation manner, as shown in FIG. 9, if the configuration information includes multiple pieces of the mode information, the first processing module 820 is further configured to select corresponding mode information according to a coverage enhancement level of the UE.

In a possible implementation manner, as shown in FIG. 9, the configuration information further includes an extension coefficient of the paging cycle. The first processing module 820 is further configured to: determine the paging cycle according to the system parameter and the extension coefficient.

In a possible implementation manner, as shown in FIG. 9, the paging message includes allocation information of an uplink resource of the UE. The paging apparatus further includes a third processing module 910 and a sending module 920. The third processing module 910 is connected to the receiving module 810 and configured to, if it is detected that there is the paging message exists in the PDSCH, determine the uplink resource according to the allocation information. The sending module 920 is connected to the third processing module 910 and configured to send uplink data or signaling on the uplink resource to the base station.

For a specific mechanism and beneficial effects of the paging apparatus configured to implement paging, by a base station, UE, reference may be made to FIG. 1 to FIG. 7 and related descriptions of FIG. 1 to FIG. 7.

Embodiment 7

Figure 10:
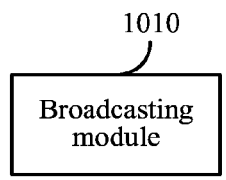
FIG. 10 shows a block diagram of a paging apparatus according to still another embodiment.

FIG. 10 shows a block diagram of a paging apparatus according to still another embodiment. As shown in FIG. 10, the paging apparatus includes a broadcasting module 1010. The broadcasting module 1010 is configured to broadcast a system message to UE, where the system message carries a system parameter and configuration information of a paging message, and the configuration information includes time-frequency information of the paging message. The system message is used to instruct the UE to determine a paging cycle, a PF and a PO subframe according to the system parameter and determine, according to the time-frequency information, a time-frequency resource occupied by the paging message in the PO subframe.

Figure 11:
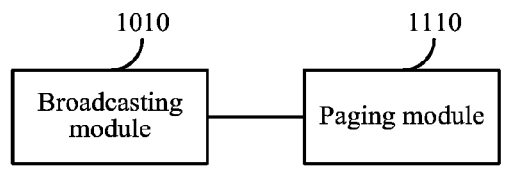
FIG. 11 shows a block diagram of a paging apparatus according to still another embodiment.

FIG. 11 shows a block diagram of a paging apparatus according to still another embodiment of the present invention. In FIG. 11, components having reference signs the same as those of components in FIG. 10 have functions the same as those of the components in FIG. 10. For brevity, detailed descriptions of the components are omitted.

In a possible implementation manner, as shown in FIG. 11, the configuration information further includes mode information of the PO subframe, where the mode information is used to specify the PO subframe occupied by the base station for sending the paging message; or the configuration information further includes an extension coefficient of the paging cycle.

In a possible implementation manner, as shown in FIG. 11, the paging apparatus further includes a paging module 1110. The paging module is connected to the broadcasting module 1010 and configured to send, within the paging cycle according to the PF, the PO subframe, and the time-frequency resource, the paging message to the UE by using a PDSCH.

In a possible implementation manner, as shown in FIG. 11, the paging message includes allocation information of an uplink resource of the UE, and the allocation information is used to instruct the UE to send, to the base station, uplink data or signaling on the uplink resource determined according to the allocation information.

For a specific mechanism and beneficial effects for the paging apparatus configured to implement paging, by the base station, the UE, reference may be made to FIG. 1 to FIG. 7 and related descriptions of FIG. 1 to FIG. 7.

Embodiment 8

Figure 12:
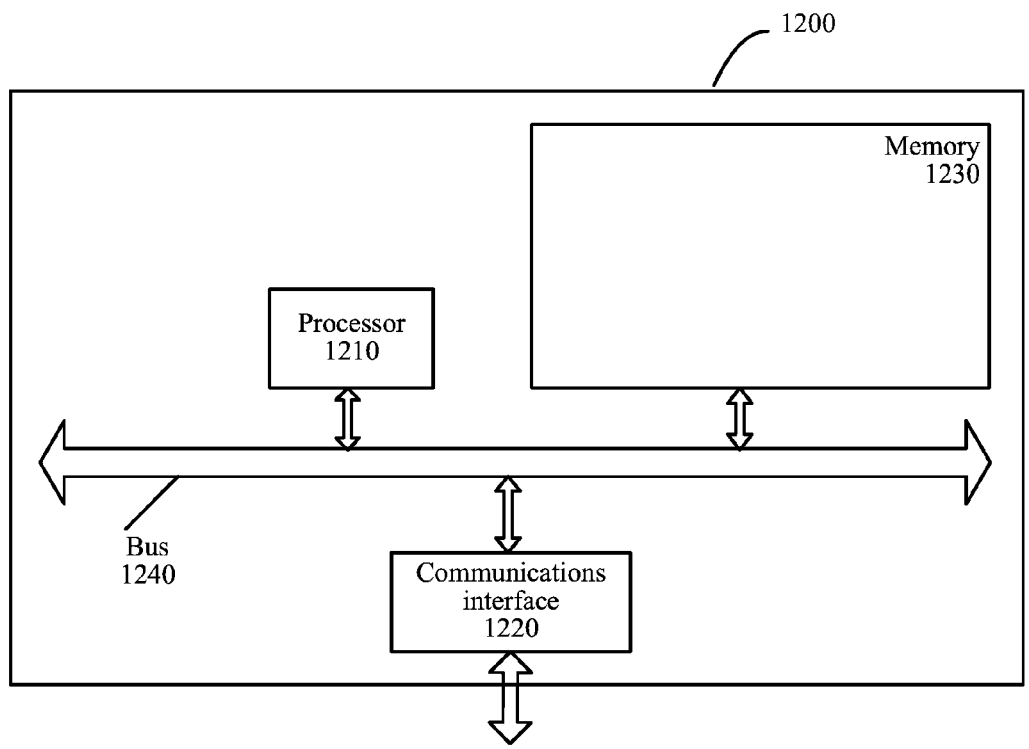
FIG. 12 shows a block diagram of a paging apparatus according to still another embodiment.

FIG. 12 shows a block diagram of a paging apparatus according to still another embodiment. The paging apparatus 1200 may be a host server having a computing capability, a personal computer PC, or a portable computer or terminal. A specific embodiment of the present invention does not limit specific implementation of a computing node.

The paging apparatus 1200 includes a processor 1210, a communications interface 1220, a memory 1230, and a bus 1240. Communication among the processor 1210, the communications interface 1220, and the memory 1230 is implemented by using the bus 1240.

The communications interface 1220 is configured to communicate with a network device, where the network device includes, for example, a virtual machine management center, a shared memory, and the like.

The processor 1210 is configured to execute a program. The processor 1210 may be a central processing unit CPU or an application-specific integrated circuit ASIC (Application-Specific Integrated Circuit), or is configured as one or more integrated circuits that implement the embodiments of the present invention.

The memory 1230 is configured to store a file. The memory 1230 may include a high-speed RAM memory, and may further include a non-volatile memory (non-volatile memory), such as at least one magnetic disk memory. The memory 1230 may be also a memory array. The memory 1230 may be also partitioned into blocks, and the blocks may be combined into a virtual volume according to a specific rule.

In a possible implementation manner, the foregoing program may be program code including a computer operation instruction. This program may be specifically used to enable UE to perform the following steps: receiving a system message broadcast by a base station, where the system message carries a system parameter and configuration information of a paging message, and the configuration information includes time-frequency information of the paging message; determining a paging cycle, a paging frame PF and a paging occasion PO subframe according to the system parameter; determining, according to the configuration information, a time-frequency resource occupied by the paging message in the PO subframe; and detecting, within the paging cycle according to the PF, the PO subframe, and the time-frequency resource, whether the paging message exists in a physical downlink shared channel PDSCH.

In a possible implementation manner, the configuration information further includes mode information of the PO subframe, where the mode information is used to specify the PO subframe occupied by the base station for sending the paging message. This program may be further specifically used to enable the UE to: determine the paging cycle according to the system parameter; determine the PF according to the system parameter and the paging cycle; and determine the PO subframe according to the PF and the mode information.

In a possible implementation manner, if the configuration information includes multiple pieces of the mode information, this program may be further specifically used to enable the UE to select corresponding mode information according to a coverage enhancement level of the UE before the determining the PO subframe according to the PF and the mode information.

In a possible implementation manner, the configuration information includes an extension coefficient of the paging cycle. This program may be further specifically used to enable the UE to determine the paging cycle according to the system parameter and the extension coefficient.

In a possible implementation manner, the paging message includes allocation information of an uplink resource of the UE. This program may be further specifically used to enable the UE to detect, according to the PF, the PO subframe, and the time-frequency resource, whether the paging message exists in a physical downlink shared channel PDSCH; and if it is detected that there is the paging message for the UE exists in the PDSCH, enable the UE to: determine the uplink resource according to the allocation information, and send uplink data or signaling on the uplink resource to the base station.

Embodiment 9

Figure 13:
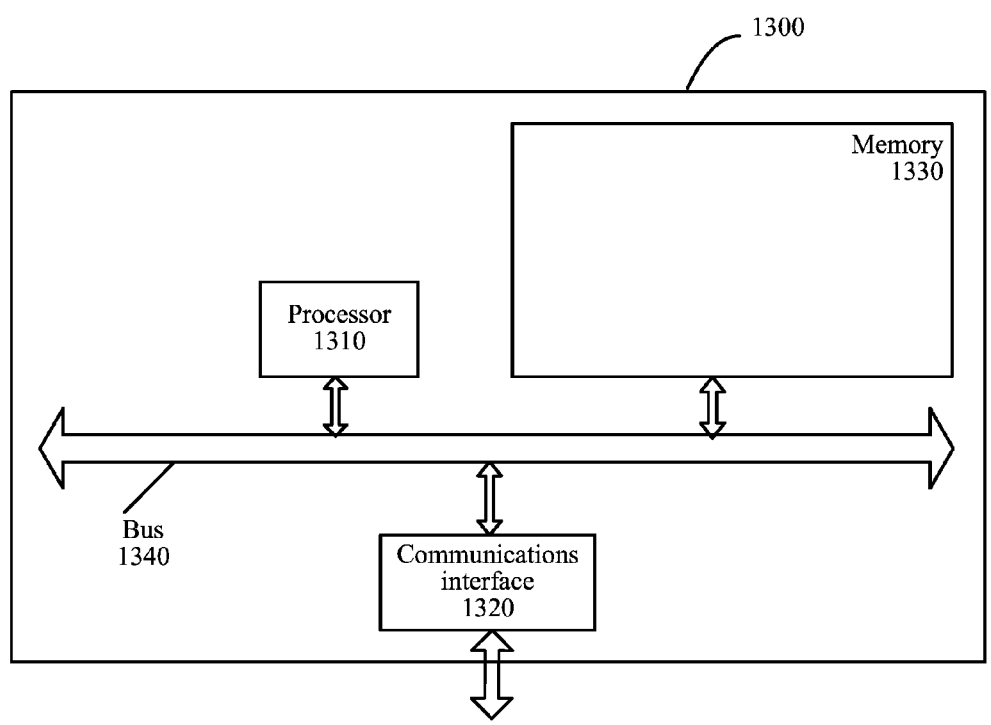
FIG. 13 shows a block diagram of a paging apparatus according to yet another embodiment.

FIG. 13 shows a block diagram of a paging apparatus according to yet another embodiment. The paging apparatus 1300 may be a host server having a computing capability, a personal computer PC, or a portable computer or terminal. A specific embodiment of the present invention does not limit specific implementation of a computing node.

The paging apparatus 1300 includes a processor 1310, a communications interface 1320, a memory (memory array) 1330, and a bus 1340. Communication among the processor 1310, the communications interface 1320, and the memory 1330 is implemented by using the bus 1340.

The communications interface 1320 is configured to communicate with a network device, where the network device includes, for example, a virtual machine management center, a shared memory, and the like.

The processor 1310 is configured to execute a program. The processor 1310 may be a central processing unit CPU or an application-specific integrated circuit ASIC (Application-Specific Integrated Circuit), or is configured as one or more integrated circuits that implement the embodiments of the present invention.

The memory 1330 is configured to store a file. The memory 1330 may include a high-speed RAM memory, and may further include a non-volatile memory (non-volatile memory), such as at least one magnetic disk memory. The memory 1330 may be also a memory array. The memory 1330 may be also partitioned into blocks, and the blocks may be combined into a virtual volume according to a specific rule.

In a possible implementation manner, the foregoing program may be program code including a computer operation instruction. This program may be specifically used to enable a base station to perform the following steps: broadcasting a system message to UE, where the system message carries a system parameter and configuration information of a paging message, the configuration information includes time-frequency information of the paging message, and the system message is used to instruct the UE to determine a paging cycle, a PF and a PO subframe according to the system parameter and determine, according to the time-frequency information, a time-frequency resource occupied by the paging message in the PO subframe.

In a possible implementation manner, the configuration information further includes mode information of the PO subframe, where the mode information is used to specify the PO subframe occupied by the base station for sending the paging message; or the configuration information further includes an extension coefficient of the paging cycle.

In a possible implementation manner, this program may be also specifically used to enable the base station to send, within the paging cycle according to the PF, the PO subframe, and the time-frequency resource, the paging message to the UE by using a PDSCH.

In a possible implementation manner, the paging message includes allocation information of an uplink resource of the UE, and the allocation information is used to instruct the UE to send, to the base station, uplink data or signaling on the uplink resource determined according to the allocation information.

A person of ordinary skill in the art may be aware that, exemplary units and algorithm steps in the embodiments described in this specification may be implemented by electronic hardware or a combination of computer software and electronic hardware. Whether the functions are implemented by hardware or software depends on particular applications and design constraint conditions of the technical solutions. A person skilled in the art may select different methods to implement the described functions for a particular application, but it should not be considered that the implementation goes beyond the scope of the present invention.

If the functions are implemented in a form of computer software and sold or used as an independent product, it can be deemed to some extent that all or some of the technical solutions of the present invention (for example, the part contributing to the prior art) are implemented in a form of a computer software product. The computer software product is generally stored in a computer readable storage medium and includes several instructions for instructing a computer device (which may be a personal computer, a server, or a network device, and the like) to perform all or some of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims. While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A paging method, comprising:
   receiving, by user equipment (UE), a system message broadcast by a base station, wherein the system message carries a system parameter and configuration information of a paging message, and the configuration information comprises time-frequency information of the paging message, and the system parameter comprises a default discontinuous reception parameter;
   determining, by the UE, a paging cycle, a paging frame (PF), and a paging occasion (PO) subframe, according to the system parameter, wherein determining the paging cycle comprises determining the paging cycle according to a smallest value between the default discontinuous reception parameter and a specific discontinuous reception parameter of the UE;
   determining, by the UE according to the configuration information, a time-frequency resource occupied by the paging message in the PO subframe, wherein the PO subframe comprises a plurality of time-frequency resources, and the configuration information indicates a time-frequency resource of the PO subframe that does not comprise all of the plurality of time-frequency resources of the PO subframe;
   detecting, by the UE within the paging cycle according to the determined PF, the PO subframe, and the time-frequency resource, whether the paging message exists in a physical downlink shared channel (PDSCH); and
   determining, according to a destination device identifier carried in the paging message, whether a user equipment identifier of the UE is consistent with the destination device identifier.

2. The method according to claim 1, wherein:
   the configuration information further comprises an extension coefficient of the paging cycle; and
   determining the paging cycle comprises:
      determining the paging cycle according to the system parameter and the extension coefficient.

3. The method according to claim 1, wherein:
   the paging message comprises allocation information of an uplink resource of the UE; and after detecting, by the UE according to the PF, the PO subframe, and the time-frequency resource, whether the paging message exists in the PDSCH, the method further comprises:
  in response to the UE detecting that the paging message for the UE exists in the PDSCH, determining, by the UE, the uplink resource according to the allocation information; and
  sending, by the UE, uplink data or signaling on the uplink resource to the base station.

4. The method according to claim 1, wherein the detecting whether the paging message exists in the PDSCH occurs in a first cycle of the determined paging cycle, and the method further comprises:
  detecting, by the UE within a second cycle of the determined paging cycle and according to the determined PF, the PO subframe, and the time-frequency resource, whether the paging message exists in the PDSCH.

5. The method according to claim 1, wherein:
  the configuration information further comprises mode information of the PO subframe, wherein the mode information specifies a PO subframe occupied by the base station for sending the paging message; and
  determining, by the UE, the paging cycle, the PF and the PO subframe according to the system parameter further comprises:
    determining, by the UE, the PF according to the system parameter and the paging cycle; and
    determining, by the UE, the PO subframe according to the PF and the mode information.

6. The method according to claim 5, wherein, in response to the configuration information comprising a plurality of pieces of the mode information, before determining, by the UE, the PO subframe according to the PF and the mode information, the method further comprises:
  selecting, by the UE according to a coverage enhancement level of the UE, corresponding mode information.

7. A paging method, comprising:
  broadcasting, by a base station, a system message to a user equipment (UE), wherein the system message carries a system parameter and configuration information of a paging message, the configuration information comprises time-frequency information of the paging message, and the system parameter comprises a default discontinuous reception parameter and a paging density, the paging density indicating a number of paging frames (PFs) in a paging cycle, and the paging cycle indicating a number of frames that are transmitted before a next paging cycle begins;
  wherein the system message instructs the UE to determine the paging cycle, a paging frame (PF) and a paging occasion (PO) subframe according to the system parameter, and to determine, according to the time-frequency information, a time-frequency resource occupied by the paging message in the PO subframe; and
  wherein instructing the UE to determine the paging cycle according to the system parameter comprises instructing the UE to determine the paging cycle according to a smallest value between the default discontinuous reception parameter and a specific discontinuous reception parameter of the UE.

8. The method according to claim 7, wherein:
  the configuration information further comprises mode information of the PO subframe, wherein the mode information specifies the PO subframe occupied by the base station for sending the paging message; or the configuration information further comprises an extension coefficient of the paging cycle.

9. The method according to claim 7, further comprising:
  sending, by the base station within the paging cycle and according to the PF, the PO subframe, and the time-frequency resource, the paging message to the UE using a physical downlink shared channel (PDSCH).

10. The method according to claim 9, wherein:
  the paging message comprises allocation information of an uplink resource of the UE, and the allocation information instructs the UE to send, to the base station, uplink data or signaling on the uplink resource determined according to the allocation information.

11. A paging apparatus, comprising:
  a receiver, configured to receive a system message broadcast by a base station, wherein the system message carries a system parameter and configuration information of a paging message, and the configuration information comprises time-frequency information of the paging message and an extension coefficient of a paging cycle, wherein the paging cycle indicates a number of frames that are transmitted before a next paging cycle begins, and wherein the system parameter comprises a default discontinuous reception parameter;
  a processor; and
  a computer-readable storage medium storing a program to be executed by the processor, the program including instructions for:
    obtaining the system message from the receiver;
    determining a paging frame (PF) and a paging occasion (PO) subframe according to the system parameter, wherein determining the paging cycle comprises determining the paging cycle according to a smallest value between the default discontinuous reception parameter and a specific discontinuous reception parameter of the paging apparatus;
    determining the paging cycle according to the system parameter and the extension coefficient;
    determining, according to the configuration information, a time-frequency resource occupied by the paging message in the PO subframe, wherein the PO subframe comprises a plurality of time-frequency resources, and the time-frequency resource of the PO subframe occupied by the paging message does not comprise all of the plurality of time-frequency resources of the PO subframe;
    detecting, within the paging cycle according to the PF, the PO subframe, and the time-frequency resource, whether the paging message exists in a physical downlink shared channel (PDSCH); and
    determining, according to a destination device identifier carried in the paging message, whether a user equipment identifier of the paging apparatus is consistent with the destination device identifier.

12. The apparatus according to claim 11, wherein:
  the paging message comprises allocation information of an uplink resource of the apparatus; and
  the program further includes instructions for, in response to detecting that the paging message for the apparatus exists in the PDSCH, determine the uplink resource according to the allocation information; and
  the apparatus further comprises a transmitter, configured to send uplink data or signaling on the uplink resource to the base station.

13. The apparatus according to claim 11 wherein:
  the configuration information further comprises mode information of the PO subframe, wherein the mode information specifies the PO subframe occupied by the base station for sending the paging message; and the program further includes instructions for:
  determining the PF according to the system parameter and the paging cycle; and
  determining the PO subframe according to the PF and the mode information.

14. The apparatus according to claim 13, wherein, in response to the configuration information comprising multiple pieces of the mode information, the program further includes instructions for selecting corresponding mode information according to a coverage enhancement level of the apparatus.

15. A paging apparatus, comprising:
  a transmitter, configured to broadcast a system message to a user equipment (UE), wherein the system message carries a system parameter and configuration information of a paging message, and the configuration information comprises time-frequency information of the paging message;
  wherein the system message instructs the UE to determine a paging cycle, a paging frame (PF) and a paging occasion (PO) subframe according to the system parameter; and determine, according to the time-frequency information, a time-frequency resource occupied by the paging message in the PO subframe;
  wherein the paging occasion (PO) subframe comprises a plurality of time-frequency resources, and the time-frequency information indicates a time-frequency resource of the PO subframe that does not comprise all of the plurality of time-frequency resources of the PO subframe; and
  wherein instructing the UE to determine the paging cycle comprises instructing the UE to determine the paging cycle according to a smallest value between a default discontinuous reception parameter and a specific discontinuous reception parameter of the UE.

16. The apparatus according to claim 15, wherein the transmitter is further configured to send, within the paging cycle according to the PF, the PO subframe, and the time-frequency resource, the paging message to the UE using a physical downlink shared channel (PDSCH).

17. The apparatus according to claim 16, wherein:
  the paging message comprises allocation information of an uplink resource of the UE, and the allocation information instructs the UE to send, to the apparatus, uplink data or signaling on the uplink resource determined according to the allocation information.

* * * * *

UNITED STATES PATENT AND TRADEMARK OFFICE
CERTIFICATE OF CORRECTION

PATENT NO. : 10,057,879 B2
APPLICATION NO. : 15/095779
DATED : August 21, 2018
INVENTOR(S) : Zhenxing Hu Page 1 of 1

It is certified that error appears in the above-identified patent and that said Letters Patent is hereby corrected as shown below:

On the Title Page

Item (30) Foreign Application Priority Data, Line 1, delete "(WO)" and insert --(CN)--.

Signed and Sealed this
Thirtieth Day of October, 2018

Andrei Iancu
*Director of the United States Patent and Trademark Office*